US010472830B1

(12) United States Patent
Middleton (10) Patent No.: US 10,472,830 B1
(45) Date of Patent: Nov. 12, 2019

(54) RAIN GUTTER DIVERTER SYSTEM

(71) Applicant: Kenneth Middleton, Columbia, MO (US)

(72) Inventor: Kenneth Middleton, Columbia, MO (US)

( * ) Notice: Subject to any disclaimer, the term of this patent is extended or adjusted under 35 U.S.C. 154(b) by 0 days.

(21) Appl. No.: 15/912,682

(22) Filed: Mar. 6, 2018

(51) Int. Cl.
*E04D 13/08* (2006.01)
*A01G 25/02* (2006.01)
*E03B 3/02* (2006.01)

(52) U.S. Cl.
CPC .............. *E04D 13/08* (2013.01); *E03B 3/02* (2013.01); *A01G 25/02* (2013.01); *E04D 2013/082* (2013.01); *E04D 2013/0813* (2013.01); *E04D 2013/0853* (2013.01); *E04D 2013/0873* (2013.01)

(58) Field of Classification Search
CPC ............ E04D 13/08; E04D 2013/0813; E04D 2013/0853; E04D 2013/0873; E04D 2013/082; E03B 3/02; E03B 3/03; Y10T 137/6969
USPC ....... 137/357, 872, 873, 874, 875, 876, 861; 52/16
See application file for complete search history.

(56) References Cited

U.S. PATENT DOCUMENTS

| | | | | |
|---|---|---|---|---|
| 192,696 A * | 7/1877 | Hoover | ................... | E03B 3/02 210/421 |
| 1,518,572 A * | 12/1924 | Croon | ................... | F02M 17/20 137/875 |
| 3,871,614 A * | 3/1975 | Hughes | ................... | E03B 9/02 251/104 |
| 5,092,003 A * | 3/1992 | Weinberg | ................... | E03B 1/04 137/873 |
| 5,114,594 A | 5/1992 | Rosebrock | | |
| 5,119,849 A * | 6/1992 | Hinkley | ................... | E04D 13/08 134/104.1 |
| 5,230,798 A * | 7/1993 | Rogman | ................ | B01D 29/23 210/447 |
| 5,533,303 A * | 7/1996 | Harvey | ................... | E03B 3/02 52/16 |
| 5,730,179 A * | 3/1998 | Taylor | ................... | E03B 3/03 137/357 |
| 6,182,680 B1 * | 2/2001 | Hart | ................... | E03B 3/03 137/122 |
| D575,853 S | 8/2008 | Adamson | | |
| 7,493,728 B2 | 2/2009 | Dussault | | |
| 8,404,110 B2 | 3/2013 | Block | | |

(Continued)

FOREIGN PATENT DOCUMENTS

WO     2009070388 A1    6/2009

*Primary Examiner* — Kevin F Murphy
*Assistant Examiner* — Jonathan J Waddy
(74) *Attorney, Agent, or Firm* — Kyle A. Fletcher, Esq.

(57) ABSTRACT

The rain gutter diverter system comprises an outer enclosure, a diverter, a height adjuster, and a ground hose. The outer enclosure extends a downspout. The diverter, located within the outer enclosure, collects and diverts a portion of the rainwater passing through the outer enclosure to a hose aperture on the side of the outer enclosure. A height adjuster coupled to the hose aperture passes the rainwater down to ground level where it enters a ground hose. The ground hose disperses the rainwater along the length of the ground hose. A flipper valve at the top of the diverter allows a user to prevent the diversion of rainwater. A debris guard above the diverter prevents debris from entering the diverter.

17 Claims, 4 Drawing Sheets

(56) References Cited

U.S. PATENT DOCUMENTS

| | | | |
|---|---|---|---|
| 8,528,263 B2 | 9/2013 | Schmidt | |
| 9,038,320 B1* | 5/2015 | Deakins | E04D 13/0767 |
| | | | 52/12 |
| 9,129,533 B2* | 9/2015 | Abu-Shaikha | G09B 19/00 |
| 2002/0056475 A1* | 5/2002 | Doiron | E03B 3/02 |
| | | | 137/122 |
| 2004/0046045 A1* | 3/2004 | Alexander | A01G 25/02 |
| | | | 239/201 |
| 2004/0200781 A1 | 10/2004 | Shaw | |
| 2004/0221891 A1* | 11/2004 | Barratt | E04D 13/08 |
| | | | 137/357 |
| 2005/0257433 A1* | 11/2005 | Dussault | E03B 3/03 |
| | | | 52/12 |
| 2008/0092958 A1* | 4/2008 | Dwyer | E03B 3/02 |
| | | | 137/118.01 |
| 2009/0229689 A1* | 9/2009 | Booth | E04D 13/08 |
| | | | 137/597 |
| 2011/0005602 A1 | 1/2011 | Harrington | |
| 2011/0290355 A1* | 12/2011 | Teoh | E03B 3/03 |
| | | | 137/575 |
| 2013/0048087 A1* | 2/2013 | Sato | E03B 1/044 |
| | | | 137/1 |

* cited by examiner

RAIN GUTTER DIVERTER SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of downspouts and irrigation, more specifically, a rain gutter diverter system.

SUMMARY OF INVENTION

The rain gutter diverter system comprises an outer enclosure, a diverter, a height adjuster, and a ground hose. The outer enclosure extends a downspout. The diverter, located within the outer enclosure, collects and diverts a portion of the rainwater passing through the outer enclosure to a hose aperture on the side of the outer enclosure. A height adjuster coupled to the hose aperture passes the rainwater down to ground level where it enters a ground hose. The ground hose disperses the rainwater along the length of the ground hose. A flipper valve at the top of the diverter allows a user to prevent the diversion of rainwater. A debris guard above the diverter prevents debris from entering the diverter.

An object of the invention is to collect and divert a portion of the rainwater passing through a downspout and to use the rainwater to irrigate ground under the eaves of a building.

Another object of the invention is to provide a ground hose to distribute the rainwater over the ground under the eaves.

A further object of the invention is to provide a valve so that a user can allow or prevent diversion of the rainwater.

Yet another object of the invention is to provide a debris guard to prevent debris from entering the diverter.

These together with additional objects, features and advantages of the rain gutter diverter system will be readily apparent to those of ordinary skill in the art upon reading the following detailed description of the presently preferred, but nonetheless illustrative, embodiments when taken in conjunction with the accompanying drawings.

In this respect, before explaining the current embodiments of the rain gutter diverter system in detail, it is to be understood that the rain gutter diverter system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rain gutter diverter system.

It is therefore important that the claims be regarded as including such equivalent construction insofar as they do not depart from the spirit and scope of the rain gutter diverter system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
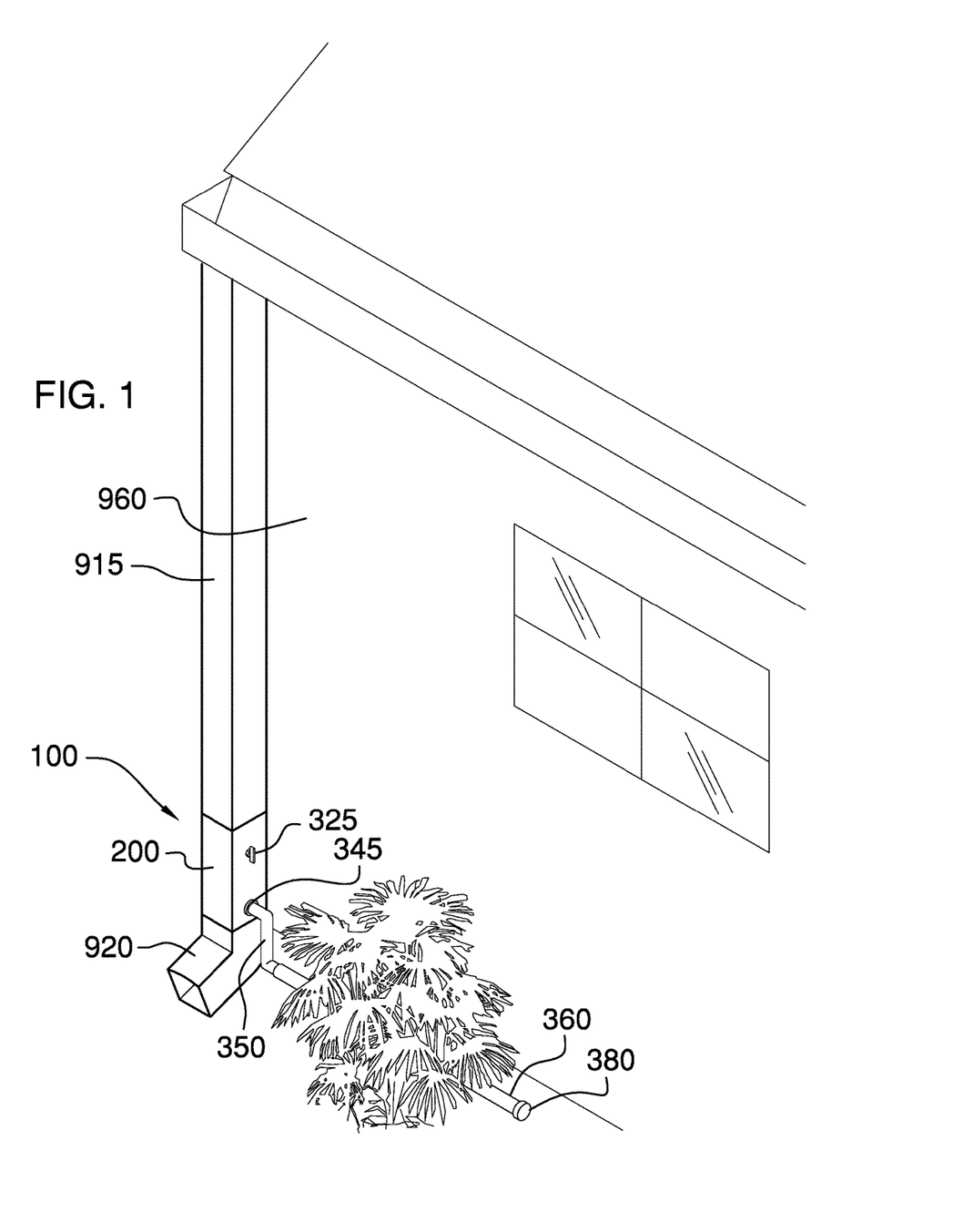
FIG. 1 is a perspective view of an embodiment of the disclosure.
Figure 2:
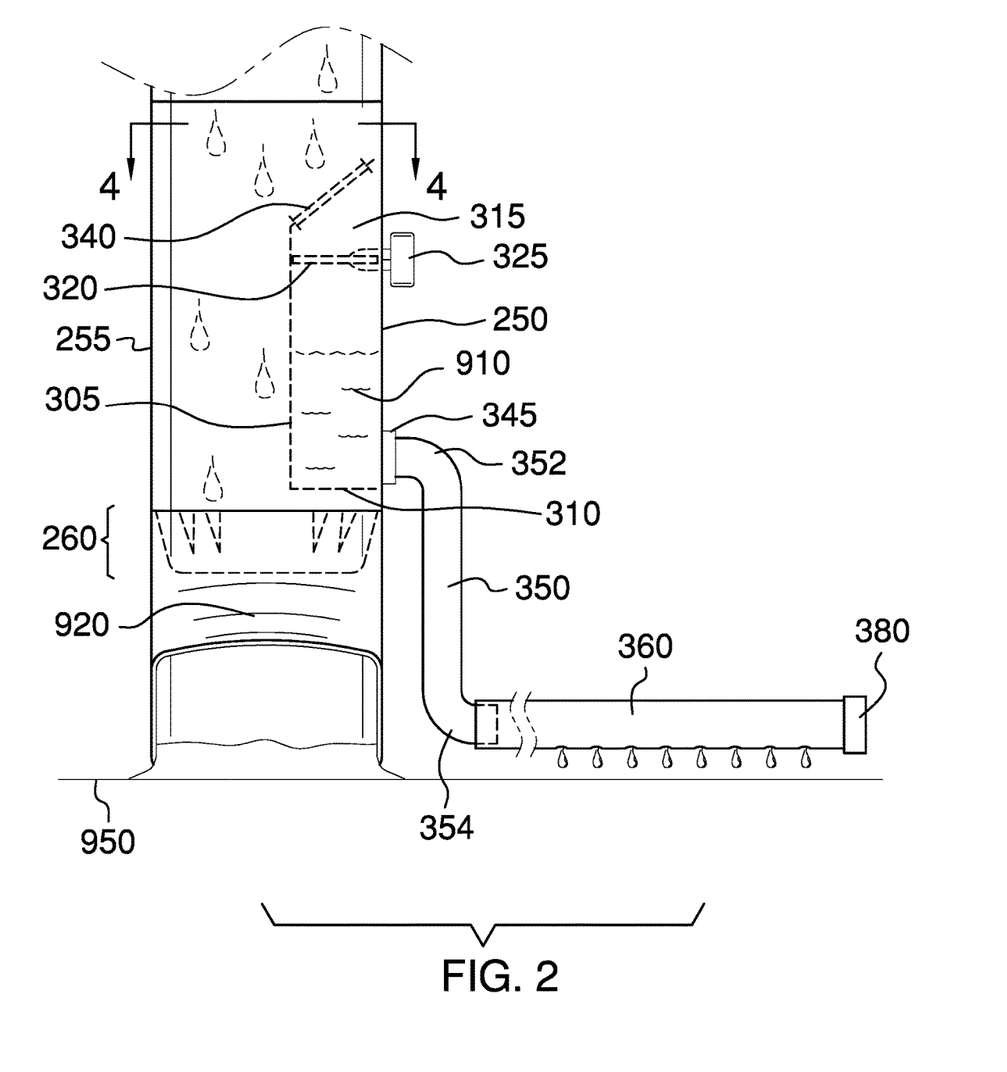
FIG. 2 is a front view of an embodiment of the disclosure.
Figure 3:
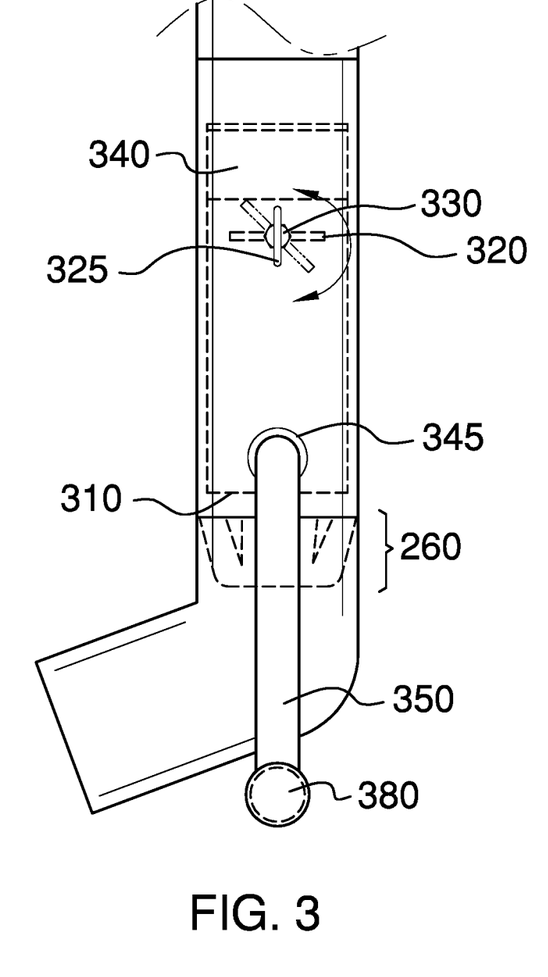
FIG. 3 is a side view of an embodiment of the disclosure.
Figure 4:
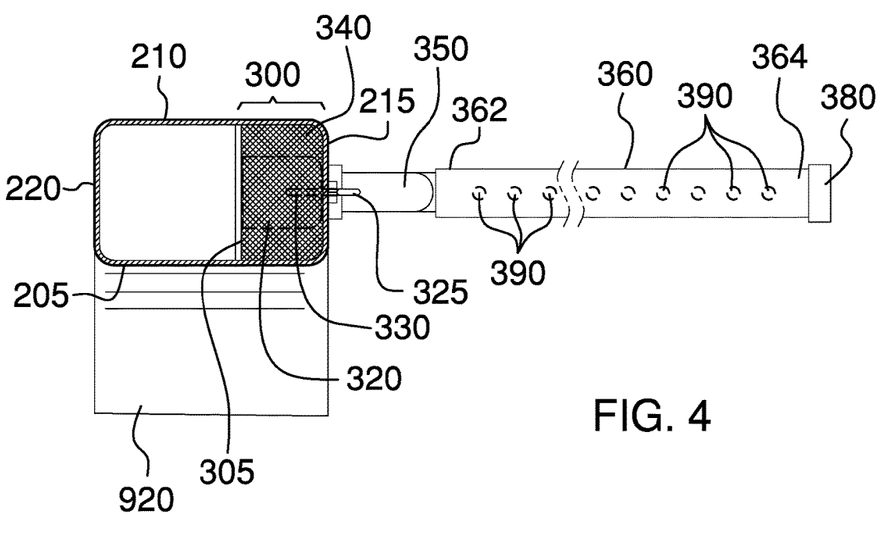
FIG. 4 is a top view of an embodiment of the disclosure.

Detailed reference will now be made to a first potential embodiment of the disclosure, which is illustrated in FIGS. 1 through 4.

The rain gutter diverter system 100 (hereinafter invention) comprises an outer enclosure 200, a diverter 300, a height adjuster 350, and a ground hose 360. The invention 100 may divert rain water 910 falling through a downspout 915 into the ground hose 360 where it may irrigate ground 950 under eaves of a building 960.

The outer enclosure 200 forms an extension to the bottom of the downspout 915. The outer enclosure 200 comprises a front wall 205, a rear wall 210, a left wall 220, and a right wall 215. The left edge of the front wall 205 may be coupled to the front edge of the left wall 220. The right edge of the front wall 205 may be coupled to the front edge of the right wall 215. The left edge of the rear wall 210 may be coupled to the rear edge of the left wall 220. The right edge of the rear wall 210 may be coupled to the rear edge of the right wall 215.

The left-to-right width of the outer enclosure 200 and the front-to-rear depth of the outer enclosure 200 may match corresponding dimensions of the downspout 915 that is attached above the outer enclosure 200 so that a crimped lower edge of the downspout 915 may slide into the top of the outer enclosure 200. The bottom of the outer enclosure 200 may be pinched, crimped, or otherwise beveled inwards such that the bottom of the outer enclosure 200 will slide into an elbow 920 that is attached below it. The bevel may define a crimped bottom 260 of the outer enclosure 200.

The top-to-bottom height of the outer enclosure 200 may be such that the elbow 920 that is attached to the bottom of the outer enclosure 200 reaches the ground 950 when the outer enclosure 200 is attached to the downspout 915 that is above the outer enclosure 200.

The diverter 300 may comprise a diverter internal wall 305, a diverter bottom 310, a hose aperture 345, and a flipper valve 320. The diverter 300 may be a compartment within the outer enclosure 200 that collects and redirects the rain water 910 as it passes through the outer enclosure 200. The diverter 300, the hose aperture 345, and the flipper valve 320 may be coupled to an enclosure side wall 250. The enclosure side wall 250 may be either the left wall 220 or the right wall 215. The figures are draw as though the enclosure side wall 250 is the right wall 215. The outer enclosure 200 may be rotated 180 degrees around a vertical axis of the outer enclosure 200 to reverse sides so that the invention 100 may be used on opposing corners of the building 960.

The diverter internal wall 305 may be a vertical panel coupled to the front wall 205 and to the rear wall 210 of the outer enclosure 200. The diverter internal wall 305 may be located at a distance from the enclosure side wall 250 which is between 1% and 99% of the distance from the enclosure side wall 250 to an opposing side wall 255, where the opposing side wall 255 is the wall of the outer enclosure 200 that is opposite the enclosure side wall 250.

The top of the diverter internal wall 305 may be at the same height as the top of the outer enclosure 200 or lower. The bottom of the diverter internal wall 305 may be at the same height as the top of the crimped bottom 260 or higher. The diverter 300 is bounded on all four sides by the diverter internal wall 305, the enclosure side wall 250, the front wall 205, and the rear wall 210. The diverter internal wall 305, the front wall 205, the rear wall 210, and the enclosure side wall 250 form a diverter aperture 315 at the top of the diverter 300. The diverter aperture 315 may be an opening where the rain water 910 may enter the diverter 300.

The diverter bottom 310 may be a horizontal panel that couples to the front wall 205 of the outer enclosure 200, to the rear wall 210 of the outer enclosure 200, to the enclosure side wall 250, and to the bottom of the diverter internal wall 305. All coupling edges between the diverter internal wall 305, the diverter bottom 310 and the outer enclosure 200 are watertight such that the diverter 300 holds the rain water 910 that enters the diverter 300.

The hose aperture 345 may be an opening through the enclosure side wall 250 that is located at the bottom of the diverter 300. The rain water 910 that enters the diverter 300 may exit the diverter 300 via the hose aperture 345.

A debris guard 340 may be located above the diverter aperture 315. The debris guard 340 may be a screen that prevents debris from entering the diverter 300. The debris guard 340 may be coupled to the top of the diverter internal wall 305, to the enclosure side wall 250, to the front wall 205, to the rear wall 210, or to combinations thereof. The debris guard 340 may be angled such that the side of the debris guard 340 that is coupled to the enclosure side wall 250 is higher than the side of the debris guard 340 that is coupled to the top of the diverter internal wall 305 so that the debris rolls off of the debris guard 340 and falls through the outer enclosure 200 next to the diverter 300.

The flipper valve 320 may be a pivoting cover at the top of the diverter 300. The flipper valve 320 may be the size of the diverter aperture 315 or smaller. The center of the flipper valve 320 may be coupled to a shaft 330. The shaft 330 may run in a horizontal orientation from the top, center of the diverter internal wall 305 to the horizontal center of the enclosure side wall 250. The shaft 330 may be pivotably coupled to both the diverter internal wall 305 and the enclosure side wall 250. The shaft 330 may extend through the enclosure side wall 250 and may be coupled to a valve handle 325 located outside of the outer enclosure 200. The valve handle 325 may allow the shaft 330 to be rotated, thus causing the flipper valve 320 to pivot. The flipper valve 320 may prevent the rain water 910 from entering the diverter 300 when the flipper valve 320 is oriented horizontally. As the flipper valve 320 is pivoted towards a vertical orientation, an increasing amount of the rain water 910 that is passing through the outer enclosure 200 may enter the diverter 300, culminating in a maximum amount of the rain water 910 entering the diverter 300 when the flipper valve 320 is oriented vertically. The shaft 330 may comprise a valve lock (not illustrated in the figures) to prevent the flipper valve 320 from pivoting except when desired. As non-limiting examples, the valve lock may comprise detents, a friction plate, a spring, or other device for preventing rotational movement.

The height adjuster 350 may be an S-shaped conduit that passes the rain water 910 from the hose aperture 345 to the ground hose 360. The height adjuster 350 may comprise an upper end 352 and a lower end 354. The upper end 352 of the height adjuster 350 may comprise an aperture that opens to the left. The lower end 354 of the height adjuster 350 may comprise an aperture that opens to the right.

The vertical length of the height adjuster 350 may match the height of the hose aperture 345 above the ground 950. Specifically, the bottom of the height adjuster 350 may touch the ground 950 when the height adjuster 350 is coupled to the hose aperture 345 and is oriented to be perpendicular to the ground 950. If the invention 100 is used with the elbow 920 that is smaller than the design point of the invention 100, the height adjuster 350 may be mounted onto the hose aperture 345 at an angle that is not perpendicular to the ground 950 to compensate for the difference in height.

The upper end 352 of the height adjuster 350 may be coupled to the hose aperture 345 on the outside of the outer enclosure 200. The lower end 354 of the height adjuster 350 may be coupled to the ground hose 360.

The ground hose 360 may be a flexible conduit that distributes the rain water 910. A first end 362 of the ground hose 360 may couple to the lower end 354 of the height adjuster 350. The ground hose 360 may extend horizontally along the ground 950 away from the height adjuster 350. A second end 364 of the ground hose 360 may be terminated using an end cap 380.

The ground hose 360 may comprise a plurality of outlet apertures 390 to allow the rain water 910 to exit from the ground hose 360 in a controlled manner. The diameter and spacing of the plurality of outlet apertures 390 may be different for various embodiments. In some embodiments, the ground hose 360 may be adapted to allow a user (not illustrated in the figures) of the invention 100 to drill the plurality of outlet apertures 390 of a diameter and spacing that specific to their application.

In use, the invention 100 is coupled to the bottom of the downspout 915 and the elbow 920 is coupled to the bottom of the invention 100. As a non-limiting example, the invention 100 may replace an existing section of the downspout 915. The valve handle 325 of the flipper valve 320 may be turned to place the flipper valve 320 in a vertical orientation. During the next rain, the rain water 910 flowing through the downspout 915 may reach the invention 100 and a portion of the rain water 910 may collect in the diverter 300 while the remainder of the rain water 910 passes through the outer enclosure 200 and exits via the elbow 920. The rain water 910 that enters the diverter 300 may flow out of the hose aperture 345, through the height adjuster 350, and into the ground hose 360. As the rain water 910 fills the ground hose 360 it will reach the plurality of outlet apertures 390 and exit the ground hose 360 at the plurality of outlet apertures 390. The valve handle 325 of the flipper valve 320 may be turned to place the flipper valve 320 in a horizontal orientation which will prevent the rain water 910 from entering the diverter 300 during subsequent rains if it is desired to stop distributing the rain water 910.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used in this disclosure, a "bevel" is a slope that is formed in the edge or surface of an object.

As used in this disclosure, a "conduit" is a tube, pipe or hose that is used to transport a fluid or a gas or is used to route, enclose, and protect permanently installed electrical cables.

As used herein, the words "couple", "couples", "coupled" or "coupling", refer to connecting, either directly or indirectly, and does not necessarily imply a mechanical connection.

As used herein, the word "desired" refers to a specific value within a range of supported values. A "desired" value indicates that a range of values is enabled by the invention and that a user of the invention may select a specific value within the supported range of values based upon their own personal preference. As a non-limiting example, for a fan that supports operational speed settings of low, medium, or high, a user may select a desired fan speed, meaning that the user may select low, medium, or high speed based upon their needs and preferences at the time of the selection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, "flexible" refers to an object or material which will deform when a force is applied to it, which will not return to its original shape when the deforming force is removed, and which may not retain the deformed shape caused by the deforming force.

As used herein, "front" indicates the side of an object that is closest to a forward direction of travel under normal use of the object or the side or part of an object that normally presents itself to view or that is normally used first. "Rear" or "back' refers to the side that is opposite the front.

As used in this disclosure, a "handle" is an object by which a tool, object, or door is held or manipulated with the hand.

As used in this disclosure, "horizontal" is a directional term that refers to a direction that is perpendicular to the local force of gravity. Unless specifically noted in this disclosure, the horizontal direction is always perpendicular to the vertical direction.

As used herein, "horizontal center" refers to a point or line that is centered from side to side between two boundaries.

As used herein, the word "hose" is intended to include hoses, tubing, piping, and other conduits capable of directing a flow of a gas or a liquid. When referring to a hose in this disclosure, the terms inner diameter and outer diameter are used as they would be used by those skilled in the plumbing arts.

As used in this disclosure, "orientation" refers to the positioning and/or angular alignment of a first object relative to a second object or relative to a reference position or reference direction.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, a "plate" is a flat, rigid object having at least one dimension that is of uniform thickness and appears thinner than the other dimensions of the object. Plates often have a rectangular or disk like appearance. Plates may be made of any material, but are commonly made of metal.

As used in this disclosure, a "screen" is a meshed structure made of wire, yarn, or cloth that allows for the free flow of air but prevents larger objects from passing through the meshed structure.

As used in this disclosure, the term "shaft" is used to describe a rigid cylinder that is often used as the handle of a tool or implement. The definition of shaft explicitly includes solid shafts or shafts that comprise a hollow passage through the shaft along the center axis of the shaft cylinder, whether the shaft has one or more sealed ends or not.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, a "valve" is a device that is used to control the flow of a fluid (gas or liquid) through a pipe or to control the flow of a fluid into and out of a container. Some valves may have multiple ports and may allow the diverting or mixing of fluids.

As used in this disclosure, "vertical" refers to a direction that is parallel to the local force of gravity. Unless specifically noted in this disclosure, the vertical direction is always perpendicular to horizontal.

As used herein, the word "watertight" refers to a barrier that is impermeable to water.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A rain gutter diverter system comprising:
an outer enclosure, a diverter, a height adjuster, and a ground hose;
wherein the rain gutter diverter system diverts rain water falling through a downspout into the ground hose where it irrigates to the ground under eaves of a building;
wherein the diverter comprises a diverter internal wall, a diverter bottom, a hose aperture, and a flipper valve;
wherein the diverter is a compartment within the outer enclosure that collects and redirects the rain water as it passes through the outer enclosure;
wherein the flipper valve is a pivoting cover at the top of the diverter;
wherein the center of the flipper valve is coupled to a shaft;
wherein the shaft runs in a horizontal orientation from the top, center of the diverter internal wall to a horizontal center of an enclosure side wall;
wherein the shaft is pivotably coupled to both the diverter internal wall and the enclosure side wall;
wherein the shaft extends through the enclosure side wall and is coupled to a valve handle located outside of the outer enclosure;
wherein the valve handle allows the shaft to be rotated, thus causing the flipper valve to pivot;
wherein the flipper valve prevents the rain water from entering the diverter when the flipper valve is oriented horizontally;
wherein as the flipper valve is pivoted towards a vertical orientation, an increasing amount of the rain water that is passing through the outer enclosure enters the diverter, culminating in a maximum amount of the rain water entering the diverter when the flipper valve is oriented vertically;
wherein the shaft comprises a valve lock to prevent the flipper valve from pivoting except when desired.

2. The rain gutter diverter system according to claim 1
wherein the outer enclosure is configured to form an extension to the bottom of the downspout;
wherein the outer enclosure comprises a front wall, a rear wall, a left wall, and a right wall; the enclosure side wall is defined by one of the front wall, the rear wall, the left wall, and the right wall;
wherein the left edge of the front wall is coupled to the front edge of the left wall;
wherein the right edge of the front wall is coupled to the front edge of the right wall;
wherein the left edge of the rear wall is coupled to the rear edge of the left wall;
wherein the right edge of the rear wall is coupled to the rear edge of the right wall.

3. The rain gutter diverter system according to claim 2
wherein the left-to-right width of the outer enclosure and the front-to-rear depth of the outer enclosure match corresponding dimensions of the downspout that is attached above the outer enclosure so that a crimped lower edge of the downspout slides into the top of the outer enclosure;
wherein the top-to-bottom height of the outer enclosure is such that an elbow that is attached to the bottom of the outer enclosure reaches the ground when the outer enclosure is attached to the downspout that is above the outer enclosure.

4. The rain gutter diverter system according to claim 3
wherein the bottom of the outer enclosure is pinched, crimped, or otherwise beveled inwards such that the bottom of the outer enclosure will slide into the elbow that is attached there below.

5. The rain gutter diverter system according to claim 4
wherein the diverter internal wall is a vertical panel coupled to the front wall and to the rear wall of the outer enclosure;
wherein the top of the diverter internal wall is at the same height as the top of the outer enclosure or lower.

6. The rain gutter diverter system according to claim 5
wherein the diverter is bounded on all four sides by the diverter internal wall, the enclosure side wall, the front wall, and the rear wall;
wherein the diverter internal wall, the front wall, the rear wall, and the enclosure side wall form a diverter aperture at the top of the diverter;
wherein the diverter aperture is an opening where the rain water enters the diverter;
wherein the flipper valve is the size of the diverter aperture or smaller.

7. The rain gutter diverter system according to claim 6
wherein the diverter bottom is a horizontal panel that couples to the front wall of the outer enclosure, to the rear wall of the outer enclosure, to the enclosure side wall, and to the bottom of the diverter internal wall.

8. The rain gutter diverter system according to claim 7
wherein all coupling edges between the diverter internal wall, the diverter bottom and the outer enclosure are watertight such that the diverter holds the rain water that enters the diverter.

9. The rain gutter diverter system according to claim 8
wherein the hose aperture is an opening through the enclosure side wall that is located at the bottom of the diverter;
wherein the rain water that enters the diverter exits the diverter via the hose aperture.

10. The rain gutter diverter system according to claim 9
wherein a debris guard is located above the diverter aperture;
wherein the debris guard is a screen that prevents debris from entering the diverter;
wherein the debris guard is coupled to the top of the diverter internal wall, to the enclosure side wall, to the front wall, to the rear wall, or to combinations thereof;
wherein the debris guard is angled such that the side of the debris guard that is coupled to the enclosure side wall is higher than the side of the debris guard that is coupled to the top of the diverter internal wall so that the debris rolls off of the debris guard and falls through the outer enclosure next to the diverter.

11. The rain gutter diverter system according to claim 10
wherein the valve lock comprises detents, a friction plate, a spring, or other device for preventing rotational movement.

12. The rain gutter diverter system according to claim 10
wherein the height adjuster is an S-shaped conduit that passes the rain water from the hose aperture to the ground hose;
wherein the height adjuster comprises an upper end and a lower end;
wherein the upper end of the height adjuster comprises an aperture that opens to the left;

wherein the lower end of the height adjuster comprises an aperture that opens to the right.

13. The rain gutter diverter system according to claim 12 wherein the vertical length of the height adjuster matches the height of the hose aperture above the ground;
wherein the bottom of the height adjuster touches the ground when the height adjuster is coupled to the hose aperture and is oriented to be parallel to the ground.

14. The rain gutter diverter system according to claim 13 wherein the upper end of the height adjuster is coupled to the hose aperture on the outside of the outer enclosure;
wherein the lower end of the height adjuster is coupled to the ground hose.

15. The rain gutter diverter system according to claim 14 wherein the ground hose is a flexible conduit that distributes the rain water;
wherein a first end of the ground hose couples to the lower end of the height adjuster;
wherein the ground hose extends horizontally along the ground away from the height adjuster;
wherein a second end of the ground hose is terminated using an end cap.

16. The rain gutter diverter system according to claim 15 wherein the ground hose comprises a plurality of outlet apertures to allow the rain water to exit from the ground hose in a controlled manner.

17. The rain gutter diverter system according to claim 16 wherein the ground hose is adapted to allow a user of the rain gutter diverter system to drill the plurality of outlet apertures of a diameter and spacing that is specific to their application.

* * * * *